Jan. 14, 1969 L. G. WARD 3,421,230
INDUSTRIAL CONVEYOR BELTS
Filed June 30, 1966
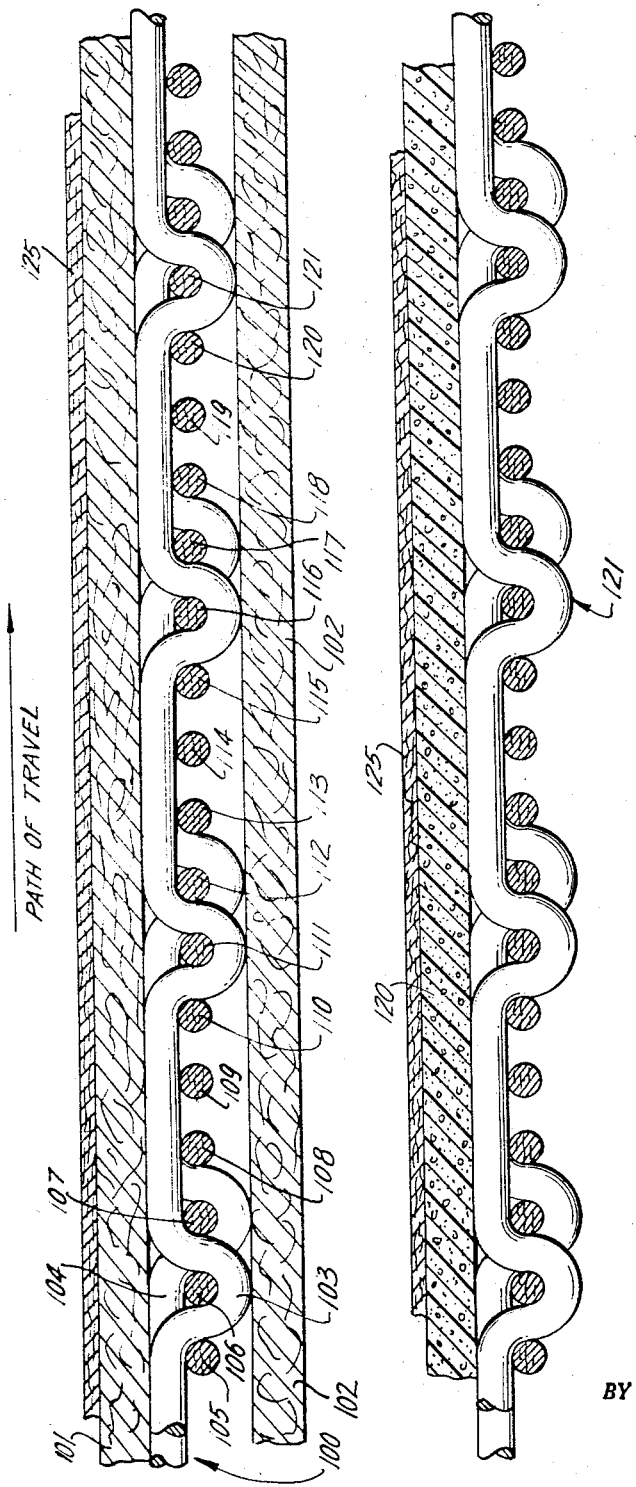
INVENTOR.
LOWELL G. WARD
BY
ATTORNEY United States Patent Office 3,421,230
Patented Jan. 14, 1969

3,421,230
INDUSTRIAL CONVEYOR BELTS
Lowell G. Ward, East Greenbush, N.Y., assignor to Huyck Corporation, Rensselaer, N.Y., a corporation of New York
Filed June 30, 1966, Ser. No. 561,864
U.S. Cl. 34—95    11 Claims
Int. Cl. F26b *13/26;* F16g *1/26;* D21f *1/10*

ABSTRACT OF THE DISCLOSURE

This invention relates to a multiple-layer endless belt, useful, for example, in the dryer section of a papermaking machine, characterized by having a longitudinal breaking strength in excess of 500 lbs. per lineal inch of width, a width, when the belt is subjected to longitudinal tension equivalent to 1,000 or less per lineal inch of width, of at least 95% its width when said belt is not under longitudinal tension, and a paper contacting surface which is permeable to fluids and does not significantly mark a web of paper of at least 35% solids content by volume when the belt is subjected to longitudinal tensions in excess of 500 lbs. per lineal inch of width while said surface is in contact with the paper being processed.

---

This invention relates to industrial conveyor belts and more particularly to textile conveyor belts suitable for use in the processing of paper and similar sheet-like materials.

Frequently, in the course of processing materials which are sheet-like in form, it is desired to have the sheet of material which is being processed in contact, continuously throughout the expanse of one of its surfaces, with an endless belt-like conveyor means whereby the material may be transported through portions of process equipment. Thus, for example, in the manufacture of paper on a so-called Fourdrinier machine, an aqueous suspension of cellulosic fibers is flowed on to an endless belt made from metal and/or synthetic filaments, and most of the water is removed therefrom by the use of well-known water extraction devices, such as hydrofoils, table rolls, and suction boxes. The continuous paper web formed thereby is then transferred to and passed through a series of nips formed by press rolls, which serves to remove additional water from the web and to compact it. Finally, the paper is passed upward and downward over a series of heated dryer rolls or cylinders (sometimes referred to as "cans") which are arranged parallel to each other in top and bottom arrays, for the purpose of further reducing its moisture content to the extent desired.

Finished paper so produced may then be further processed, as by being impregnated, or coated, or laminated, on process equipment of well-known-design suitable for such use.

In certain of the processes heretofore described, it is sometimes desirable to subject the conveyor belts to extraordinarily high longitudinal tensions in order to increase the pressure with which the sheet of paper is held against portions of the process equipment. For example, in the so-called "dryer section" of papermaking machines, it is well known in the present technology to utilize fabric conveyor belts to hold the paper sheet against a substantial portion of the circumference of each of the dryer rolls (e.g. see Pulp and Paper Manufacturing, volume 3, chapter 1, part 5, pp. 299 et seq., McGraw-Hill Book Company, Inc., New York, 1953). However, the fabrics heretofor so used are normally operated under a tension of only about 7½ lbs. per lineal inch of width, making it possible to utilize materials for their fabrication, such as cotton duck or canvas, which were sufficiently heat and moisture tolerant, albeit of comparatively low strength. Furthermore, it is improbable that even the open weave dryer fabrics made from comparatively fine monofilament or multifilament yarns of all synthetic materials such as nylon, which are a recent innovation in this art, would, even in view of the higher tensile strength inherent to their constituent material, be suitable for sustained use exposed to the temperatures typically encountered in the dryer section of a papermaking machine of 270° F. or more, at tensions significantly higher than 50 lbs. per lineal inch of width, because the necessary increases in size of the constituent yarns, to the point where permanent distension, or even actual rupture of the fabric may be avoided, will be accompanied by surface roughness, producing sheet marking as well as the other adverse effects hereinafter discussed.

Therefore, if it is desired to operate in such a location with a conveyor belt at extraordinarily high tensions, that is, at tensions of about 500 lbs. or more per lineal inch of width of the belt, the belts heretofore available are inadequate for the intended purpose.

An example of one of the situations where it might be desired to so operate is that of a modification of the dryer section of a "Yankee" machine (see pp. 511 et seq., op. cit.) wherein drying efficiency and paper quality may be improved by wrapping a belt about a substantial portion of the circumference of the Yankee dryer roll so that the paper sheet is positioned between the belt and the roll face. More particularly, the "machine glaze" that is desired on certain grades of paper, which necessitates the application of high pressures between the paper sheet and the Yankee dryer roll face heretofor created solely by use of auxiliary pressure rolls, can be effected throughout the drying cycle over substantially the entire circumference of the Yankee dryer roll through use of the belt herein contemplated.

Another example of a situation where the use of a belt under high tension might be desired is where one or more rolls in the dryer section of a Fourdrinier machine of the dryer is made gas pervious as, for example, according to the teachings of U.S. Patent 3,246,401. Then the fabric belt backing the sheet of paper must be subjected to extraordinarily high longitudinal tensions, at least throughout that portion of its path of travel where it presses the sheet of paper against the roll face, in order to prevent the sheet of paper from billowing as it is impinged upon by gas flowing from the interior of the roll.

Another example of a situation where such a belt might be useful is in the continuous paper impregnation processes which involve the application of the impregnating material by pressure techniques, requiring the use of extraordinarily high tension tolerant conveyor belts of the type herein contemplated.

Still another example is in a so-called "high rate" dryer, wherein one of the regular dryer cans in the dryer section of a papermaking machine is mounted in a reinforced frame structure with extra heavy duty bearings, and the belt and paper wrap about 160° or more of the roll face under high tensions, whereby the dryer may optionally be operated at higher temperatures and at higher speeds than normally is the case, and whereby a better quality paper may be produced more efficiently.

Frequently, it is found desirable to localize the area of increased tension to the region of individual portions of process equipment, as for example, to the circumference only of a roll. Such localization of tension obviates the necessity of reinforcing the carrier structure throughout the apparatus, in order to accommodate the increased loading on shafts, bearings, etc., necessitated by the added tension itself.

It is well-known that the mechanical pressure which is exerted radially by a flexible belt upon a cylinder about which the belt is wrapped under tension may be calculated by the following formula $$P = T/R$$

where:

P is the unit pressure in pounds per square inch effected by the belt on the roll face, T is the tension applied to the belt in pounds per lineal inch of width, and R is the radius of the roll in inches.

If, for example, it is desired to utilize a belt to "wrap around" a Yankee dryer roll as herein described, and if it is desired to erect a pressure of 20 lbs. per square inch on the paper in order to effect the desired degree of "machine glaze" and drying efficiency, it will take about 1,000 lbs. tension on the belt per lineal inch of width if a Yankee dryer roll 8 feet in diameter (the minimum diameter of such rolls now in general use) is used. Similarly, it may be demonstrated that extraordinarily high tension should desirably be used if the maximum utilization is to be achieved of the hot-gas permeable "thru-dryer" roll as heretofor described.

Heretofore, attempts to incorporate into a fabric conveyor belt structural features adequate to accommodate such extraordinarily high longitudinal tensions have been accompanied by results which proved to be detrimental to the belt and to the paper sheet. For example, if one were merely to increase the size of the longitudinally oriented constituent yarns in a plain weave fabric conveyor belt as heretofor known, the "knuckles" where each such longitudinal yarn passes over a transverse yarn causes marks to be made in the sheet of paper as the fabric is subjected to high longitudinal tensions, particularly since the web of paper as initially exposed to a Yankee or a thru-dryer roll, for example, is very susceptable to marring, since it normally is only about 35–60% solids by volume; the balance being water. A makeshift means by which there have been attempts to avoid this result has been by the interposition of a regular papermaker's felt between the paper sheet and the conveyor belt. This expedient, sometimes, has not proved satisfactory because of obvious structural complications, with their attendant increases in expense. Furthermore, whenever it was attempted to subject to high longitudinal tensions, woven conveyor belts of the type heretofore used, the consequent straightening of the "knuckles" of the longitudinally oriented constituent yarns tended, by the phenomena known as "crimp interchange," to shorten the transverse yarns of the fabric by the corresponding increase in the degree to which they were knuckled or crimped about the longitudinal yarns. The effects of this phenomenon are extremely undesirable, because it tends to induce wrinkles in the paper sheet which may become permanently set by the high pressure and heat conditions to which the sheet may be concurrently exposed.

Thus, it is an object of this invention to produce an industrial conveyor belt which is suitable for operation under extraordinarily high longitudinal tensions.

It is another object of this invention to produce an industrial conveyor belt which will not tend to narrow upon being subjected to substantial increases in longitudinal tension.

It is still another object of this invention to produce an industrial conveyor belt which will not, while under extraordinarily high longitudinal tension, significantly mark the surface of sheet-like material, such as paper, which it is transporting.

Still another object of this invention is to produce an extraordinarily high tension tolerant, dimensionally stable, conveyor belt which can be used for extended periods of time, exposed to elevated temperatures at which the material that it is transporting is treated.

Yet another object of this invention is to produce a conveyor belt having high tension tolerance and dimensional stability, and sufficient permeability to render it suitable for use in paper processing, such as papermaking.

These and other objectives, which will be readily apparent to those skilled in the art, may be achieved through practice of this invention, in which an endless industrial conveyor belt having extraordinarily high longitudinal strength, transverse dimensional stability upon variation in the longitudinal tension on the belt, and substantial freedom from tendency to mark the material being conveyed while the belt is under extraordinarily high longitudinal tension, is made by weaving a base fabric having high strength, longitudinally oriented yarns which are substantially straight and parallel to the median plane of said fabric substantially throughout their length, and affixing to that surface thereof which faces toward the material being transported, a surface layer which is permeable to moisture, steam, or other gaseous suspensions of liquids, and is substantial enough and smooth enough, at least throughout that portion of it which comes in contact with the material being transported, to prevent the surface of the material being transported from being marked by surface iregularities of the fabric when the belt is under extraordinarily high longitudinal tension.

This invention can readily be understood from the following specifications and from the following drawings in which:

FIGURE 1 is a cross sectional view of one embodiment of this invention looking in the transverse direction, and FIGURE 2 is a cross sectional representation of another embodiment of this invention looking in the transverse direction.

FIGURE 1 depicts one embodiment of this invention. It is a cross sectional view of a portion of a conveyor belt looking in the transverse direction, i.e., in the direction which is substantially at right angles to the path of travel of the belt when it is in use, which path direction is also referred to herein as the "longitudinal" or "machine" direction (or "dimension") of the belt. This belt comprises a base fabric layer 100 and surfacing layers 101, 102. The fabric layer 100 is made with a multiplicity of longitudinally extending yarns which are parallel to each other, such as those labeled 103, 104, and a multiplicity of transverse oriented parallel yarns 105, 106 ... 121.

In the embodiment illustrated in FIGURE 1 the base fabric layer 100 has been woven in a so-called "five-harness satin weave." One of the important features of this invention is that the yarns of the base fabric which are longitudinally oriented, and therefore are the ones which are primarily subjected to machine direction tensions when the belt is in use, are substantially straight throughout most of their length, with the straight portions thereof oriented substantially parallel to the median plane of the base fabric itself. As used in this specification and the claims which form part of the teaching of this invention, "substantially straight" means that the yarns to which the term is applied are axially aligned substantially in the direction of applied tension throughout at least 70% of their axial length.

In the embodiment illustrated in FIGURE 1, for example, it will be noted that the longitudinal yarn 103 passes over transverse yarn 105 but under the next adjacent transverse yarn 106, then over the group of four transverse yarns 107, 108, 109, and 110. Then the longitudinal yarn 103 passes under the next adjacent transverse yarn 111 and then over the next group of four transverse yarns 112, 113, 114, and 115, and so forth throughout the loop length of the belt. Similarly, the longitudinal yarn 104, which is next adjacent to longitudinal yarn 103, would likewise pass under a transversely oriented yarn and over an adjacent group of four transversely oriented yarns in that sequence throughout the loop length of the belt. Consistent with widely accepted practice in the textile art, adjacent longitudinally oriented yarns normally will not pass under the same transverse oriented yarn.

As previously stated, the base fabric layer illustrated in the embodiment shown in FIGURE 1 is what is usually termed a "five-harness satin weave." It will be apparent to those skilled in the textile art that although a wide variety of textile weaves will be suitable for the use herein desired, satin weaves of at least four harnesses are ideally suited for use in this invention, because in satin weaves of four or more harnesses (including "pseudo-satin weaves" such as the so-called six-harness weave), the presence of relatively long "float" portions in the longitudinally oriented yarns makes it possible to have these yarns straight substantially throughout their length while, at the same time, permitting the construction of a fabric which has great structural integrity. In addition, the presence of the floats in such weaves tends to decrease the number of crossover knuckles and to "mask" the underlying transverse yarn system, thereby assisting in the elimination of marking of the paper sheet being transported when substantial pressure is applied thereto by the application of tension on the conveyor belt.

The feature of having the longitudinally oriented yarns straight substantially throughout the length is significant in the practice of this invention insofar as it not only tends to provide a structurally advantageous tension bearing yarn system which also impedes surface marking, but also insofar as it tends to promote dimensional stability in the transverse dimension of the belt as tensions are varied in the longitudinal direction on the belt since this tends to limit the amount of "crimp interchange" which occurs in the fabric base layer portion of the belt. "Crimp interchange" in this context means the tendency of a yarn oriented in one direction of the fabric to become crimped to a greater degree by the action of a crossing yarn becoming straighter upon the application of tension to the crossing yarn.

By means of the reduction in crimp interchange herein contemplated, the transverse dimension of the belt may be kept within the desired maximum reduction of 5% upon the application of longitudinal tensions on the belt as high as or even higher than 1,000 lbs. per linear inch of width, thereby avoiding serious damage to the paper being processed through constriction of the belt while under tension, with attendant wrinkling of the paper.

While a satin weave has been illustrated in the embodiment illustrated in FIGURE 1, it will be apparent to those skilled in the art that other weaves, including twill weaves, having "float" or straight portions substantially as hereintofor described, may be substituted without departing significantly from the spirit and scope of this invention. Further, satin or other weaves of more than five harnesses may be advantageously used in the practice of this invention, although there is a practical limit to the desirable length of the float portions which should or can be produced, in view of which weaves of more than 8 harnesses, or perhaps as many as 10, will not ordinarily be utilized.

The yarns in the base fabric layer may be made from a wide variety of materials, provided they have the requisite physical characteristics such as strength, flexibility, thermal stability, and chemical stability, to be compatable with the environments attendant to the uses contemplated. However, it has been found that while monofilament or multifilament yarns made from synthetic materials including those materials chemically designated as polyamides, polyesters, acrylics and copolymeric materials may be advantageously used in the practice of this invention, multifilament yarns made from polyesters such as those sold under the names Dacron, Kodel, and Fortrel, are now preferred since they not only are inexpensive and readily available commercially and possess desirable tensile strength characteristics, but also because they may be heat set. Thus it has been found advantageous in the fabrication of a base layer fabric for utilization in this invention to subject the finished fabric to heat treatment, thereby permanently setting the "knuckles" (or "crimps" or curved portions) of the longitudinally oriented yarns where they pass around one or more transverse yarns, as well as for the well-known purpose of heat setting to relieve internal stresses in the yarn material to avoid shrinkage upon the application of heat to the finished felt, as, for example, in the dryer section of a papermaking machine.

It will be apparent that the longitudinal strength characteristics of finished belts of the type herein contemplated will depend, in large measure, on the inherent strength of the longitudinally oriented yarns. Therefore, it has been found desirable to have the aggregate strength of such yarns in excess of 1,000 lbs. for each inch of belt width over which the constituent longitudinal yarns are arrayed, particularly in constructions having needled surfacing layers as hereinafter described, since there is some tendency for the barbed needles used in the needling operation to derogate the underlying yarn system. However, it will be apparent that through practice of this invention this end may be achieved while avoiding the adverse effects heretofor attendant thereto merely by increasing the size of the constituent longitudinally oriented yarns.

It should be clearly understood that the base fabric layer herein contemplated may be produced by any suitable or well-known weaving techniques. Thus the base fabric layer may be woven "flat," that is, with the warp yarns in the loom ultimately oriented in the longitudinal (or "path of travel" or machine) direction of the finished belt; the belt being made endless, or into a closed loop by joining the ends into a strong connection by joining techniques which are well known in the textile arts, particularly that having to do with the making of papermakers' fabrics. However, it has been found advantageous in the practice of this invention to weave the base fabric layer utilizing the endless weaving techniques well known in the art of manufacturing papermakers' fabrics. When these techniques are used, the warps in the loom end up as the transverse (or "cross-machine") oriented yarns in the finished fabric, whereas the wefts or filling yarns in the loom form a continuous helix oriented in the machine direction (or longitudinally) in the finished belt.

After fabrication of the fabric base layer, a surfacing material is applied at least to that surface of the base layer which will face toward the paper 125 when the belt is in use. This layer is desirable because it tends to further inhibit any tendency of the belt to mark the sheet of paper as tension is applied to the belt, and facilitates water removal from the sheet of paper. Typically, this surfacing layer may be effected by carding batts of staple fibers, applying one or more layers of such batts to the surface of the base fabric, and needling the fibers of the batts into each other and into the base fabric layer, according to "needling" techniques which are well known in the textile arts.

It has been found advantageous in the practice of this invention to apply surfacing layers to both sides of the base fabric layer since this provides for intermingling of fibers from each of the surfacing layers with those of the other and with the base fabric, thereby permitting the surfacing layers to be more securely affixed to the base layer.

Thus referring again to FIGURE 1, depicted therein are surfacing layers 101, 102. These layers may be comprised of any materials suitable for the purpose, such as synthetics including polyamides, polyesters, acrylics, or other copolymeric or natural materials such as wool, or blends of natural and synthetic materials, but it has been found preferable in the practice of this invention to make the surfacing layers almost completely from staple fibers of synthetic material, preferably a polyester such as that sold under names Dacron, Kodel, and Fortrel, since the use of these materials in the surfacing layers, like their use in the base fabric layers, tends to impart to the finished belt high moisture thermal, chemical and mechanical tolerance. Of course, the finished fabric and/or the finished belt may be further treated with resins or other materials according to well known finishing techniques for the purpose of improving or varying its various properties.

FIGURE 2 illustrates another embodiment of this invention. In FIGURE 2, a five-harness satin weave base layer made from suitable material consistent with the teachings hereinbefore set forth, has affixed to it a surfacing layer of foam plastic material. Polyurethane foam material has been found to be particularly suitable for the use herein contemplated. The surfacing layer of foam plastic material 120 typically will be affixed to the base layer 121 by means adapted for the purpose, such as by use of an adhesive material applied to one or both of the adjacent surfaces of the base fabric and the plastic surfacing layer. In some cases, it has proved advantageous to extrude foam plastic material on both sides of the base fabric layer so that the base fabric layer, in effect, becomes a reinforcing scrim embedded within a continuous foam plastic system. The use of foam plastics as opposed to solid plastic materials has been found to be particularly advantageous since it provides porosity, absorbency, resiliency, and cushion characteristics analogous to those achievable by use of batts of staple fibers, such as are illustrated in FIGURE 1.

EXAMPLE

The following is a description of one example of this invention made substantially in the form of the first embodiment heretofore described and illustrated in FIGURE 1.

The warp yarns used were 2 plied yarns made from 100% polyester (Dacron) staple in which the singles were made with twist of 5.6 turns per inch S (or left-hand lay) twist, and the ply yarn was made with a twist of 5 turns per inch Z (or right-hand lay) twist; the total weight of the plied warp yarn being about 860 grains per 100 yards. This warp yarn was dressed in a loom for weaving endless papermaker's fabrics, at 16 ends per inch (8 ends each for the top and bottom sheds).

The weft or filling yarn used was a 100% polyester multifilament (type 52 Dacron) high tenacity yarn, made by plying (5 yarns of 1100 denier having 250 filaments each 3½ turns per inch Z (right-hand lay) twist and cabling 3 such plies 3½ turns per inch S (left-hand lay) twist. The base fabric was then woven endless (or tubular) with a weft (or filling yarn) count of 13.5 picks per inch of width in the top as well as in the bottom sheds, that is, in the cross-machine direction of the finished fabric, in a so-called "6-harness satin" weave. The base fabric was then drawn out to a tension equivalent to about 300 pounds per linear inch of width and heat set at about 300° F.

Next, 100% polyester staple fiber batts were positioned on and needled to the outer surface of the fabric, the fabric was turned inside out, and more batts were positioned on the other side of the fabric; the batts being needled to the base fabric and to each other in a standard needle loom, with particular care being taken to assure a smooth surface throughout that portion of the outer finishing layer where it will come into contact with the paper when the belt is in use. Finally, the finished fabric was heat set again at about 300° F. at a tension equivalent to about 300 pounds per lineal inch of width.

It would be understood that the phrases and expressions as well as the embodiments which are set forth in the teaching of this invention are by way of illustration and not of limitation and that numerous equivalents will be readily apparent to those skilled in the art by which the teachings herein disclosed may be practiced without departing significantly from the spirit and scope of this invention.

I claim:

1. An endless belt for use in processing paper, which belt is characterized by having, in combination, a longitudinal breaking strength in excess of 500 lbs. per lineal inch of width, a width, when the belt is subjected to longitudinal tension equivalent to 1,000 or less per lineal inch of width, of at least 95% its width when said belt is not under longitudinal tension, and a paper contacting surface which is permeable to fluids and does not significantly mark a web of paper of at least 35% solids content by volume when the belt is subjected to longitudinal tensions in excess of 500 lbs. per lineal inch of width while said surface is in contact with the paper being processed, the belt comprising:

a base layer comprising a woven fabric having longitudinally extending members which are substantially parallel to the median plane of said fabric throughout at least 70% of their axial length, said fabric being so woven that each of said longitudinally extending members passes one of the transversely extending members comprising said fabric on one surface of said fabric alternately with groups of at least four of said transversely extending members of said fabric on the other surface of said fabric which faces said paper when said belt is in use, and a surfacing layer affixed to the surface of said base layer which faces said web of paper when said belt is in use, said surfacing layer being smooth at least throughout that portion of its outer surface which contacts said web of paper when said belt is in use.

2. The article described in claim 1 having a second surfacing layer affixed to said base layer on the opposite side thereof from said smooth surfacing layer, said surfacing layers being made from batts of carded staple fibers which are needled together and to said base layer.

3. The article described in claim 2 wherein said surfacing layers and said fabric are made substantially entirely from synthetic materials selected from the group consisting of polyamide, polyester, acrylic, and copolymeric materials.

4. The article described in claim 3 wherein said fabric is made in a satin weave.

5. The article described in claim 3 wherein said longitudinally extending members are permanently crimped about each of said one transversely extending members and are heat set.

6. The article described in claim 3 wherein said fabric comprising said base layer is woven endless.

7. A method of making an endless belt for use in processing paper which belt is characterized by having, in combination, a longitudinal breaking strength in excess of 500 lbs. per lineal inch of width, a width, when said belt is subjected to any longitudinal tension equivalent to 1,000 lbs. or less per lineal inch of width, of at least 95% its width when said belt is not under longitudinal tension, and a paper contacting surface which is permeable to fluids and does not significantly mark a web of paper of at least 35% solids content by volume when the belt is subjected to longitudinal tensions in excess of 500 lbs. per lineal inch of width while said surface is in contact with the paper being processed, comprising the steps of:

making a woven fabric in which the constituent members which are longitudinally oriented in the finished belt have an aggregate strength in excess of 500 lbs. per lineal inch of width of said fabric and reside substantially parallel to the median plane of said fabric throughout at least 70% of their axial length and wherein each longitudinally extending member passes one of the transversely extending members of said fabric on one surface of said fabric alternately with groups of at least four of said transversely extending members of said fabric on the other surface of said fabric, said other surface being that surface of said fabric which faces said paper when said belt is in use, and finishing at least the surface of said fabric which faces said paper when said belt is in use by affixing thereto a surfacing layer which is smooth at least throughout that portion of its outer surface which contacts said paper when the belt is in use.

8. The method described in claim 7 wherein the step of finishing said surface of said base layer comprises carding staple fibers into batts, laying said batts on to both sides of said base layer, and needling said batts to said base layer and to each other to the extent that they overlap one another.

9. The method described in claim 8 wherein the step of making said fabric comprises the steps of selecting the members to be used in weaving said fabric from the group consisting of monofilaments and multifilaments of polyamide, polyester, acrylic, and copolymeric filament forming materials, and heat setting the crimps in said longitudinally extending members about each of said one transversely extending members.

10. The method described in claim 9 wherein the step of making said fabric comprises weaving a satin weave.

11. The method described in claim 8 wherein the step of making said fabric comprises weaving said fabric endless.

References Cited

UNITED STATES PATENTS

| 1,452,704 | 4/1923 | Poulin et al. | 34—95 |
| 2,903,021 | 9/1959 | Holden et al. | |
| 3,214,327 | 10/1965 | Wicker et al. | 34—95 XR |
| 3,214,329 | 10/1965 | Wicker | 162—358 |
| 3,331,140 | 7/1967 | Bernard | 34—95 |

FOREIGN PATENTS

| 691,463 | 7/1964 | Canada. |

FRED C. MATTERN, JR., *Primary Examiner.*

JAMES A. WONG, *Assistant Examiner.*

U.S. Cl. X.R.

74—232; 162—348